(12) United States Patent
Chen et al.

(10) Patent No.: US 6,988,834 B2
(45) Date of Patent: Jan. 24, 2006

(54) FIBER OPTIC CONNECTOR MODULE

(76) Inventors: Wenzong Chen, 959 Honest Pleasure Dr., Naperville, IL (US) 60540; Thomas R. Marrapode, 2512 Wild Timothy Rd., Naperville, IL (US) 60564; Hua Liu, 2327 Trowbridge Way, Lisle, IL (US) 60532; Igor Grois, 4010 Greenacre Dr., Nrothbrook, IL (US) 60062

( * ) Notice: Subject to any disclaimer, the term of this patent is extended or adjusted under 35 U.S.C. 154(b) by 0 days.

(21) Appl. No.: 10/926,523

(22) Filed: Aug. 26, 2004

(65) Prior Publication Data
US 2005/0025432 A1 Feb. 3, 2005

Related U.S. Application Data

(63) Continuation of application No. 10/279,675, filed on Oct. 24, 2002, now Pat. No. 6,811,322.

(51) Int. Cl.
*G02B 6/36* (2006.01)

(52) U.S. Cl. .......................... 385/78; 385/81

(58) Field of Classification Search ............ 385/78–85, 385/60, 72
See application file for complete search history.

(56) References Cited

U.S. PATENT DOCUMENTS

| | | | |
|---|---|---|---|
| 6,361,218 B1 * | 3/2002 | Matasek et al. | 385/60 |
| 6,439,778 B1 * | 8/2002 | Cairns | 385/60 |
| 6,709,169 B2 * | 3/2004 | Rossi | 385/92 |
| 2002/0186931 A1 * | 12/2002 | Seo et al. | 385/60 |
| 2003/0095755 A1 * | 5/2003 | Vaganov et al. | 385/88 |
| 2003/0123808 A1 * | 7/2003 | Smith et al. | 385/53 |
| 2004/0017983 A1 * | 1/2004 | Chen et al. | 385/78 |

* cited by examiner

Primary Examiner—John D. Lee
Assistant Examiner—Kevin S. Wood

(57) ABSTRACT

A fiber optic connector module includes a ferrule terminated to at least one optical fiber. The ferrule has a rearwardly facing abutment surface. The ferrule is mounted within a housing which includes a forwardly facing abutment surface for engaging the rearwardly facing abutment surface on the ferrule. The forwardly facing abutment surface on the housing is convexly rounded so that the ferrule can tilt relative to the housing.

4 Claims, 4 Drawing Sheets

FIBER OPTIC CONNECTOR MODULE

This application is a continuation of application Ser. No. 10/279,675 filed Oct. 24, 2002, now U.S. Pat. No. 6,811,322.

FIELD OF THE INVENTION

This invention generally relates to the art of fiber optic transmission and, particularly, to a fiber optic connector module.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connector device.

A pair of fiber optic connectors or a connector and another optical fiber transmission device often are mated in an adapter which centers the fibers to provide low insertion losses. The adapter couples the connectors together so that their encapsulated fibers connector end-to-end. The adapter may be an in-line component, or the adapter can be designed for mounting in an opening in a panel, backplane, circuit board or the like.

Various problems continue to be encountered in designing fiber optic connector assemblies or other connector assemblies, including applications involving backplanes, motherboards, daughterboards and the like. U.S. Pat. No. 6,361,218, dated Mar. 26, 2002, which is assigned to the assignee of the present invention and which is incorporated herein by reference, shows a fiber optic connector module which is a very simple design and solves some of the problems of the prior art. However, problems still exist in aligning the ferrules of mating fiber optic connectors in adapters or other fiber optic connector devices. Specifically, if a fiber optic connector module is tilted or skewed within its fiber optic connector, even to a small extent, the ferrule which is fixed within the module will tilt or skew therewith. Therefore, the flat mating face at the front end of the ferrule will be at an angle to the flat mating face of the ferrule of the mating connector, and transmission losses may occur. The present invention is directed to solving these problems by allowing the ferrule to tilt relative to the module housing and, thereby, maintain a flush front face abutment of the ferrule with the ferrule of the mating connector.

SUMMARY OF THE INVENTION

An object, therefore, of the invention is to provide a new and improved fiber optic connector module of the character described.

In the exemplary embodiment of the invention, the fiber optic connector module includes a ferrule terminated to at least one optical fiber. The ferrule includes a forwardly facing latch surface and a rearwardly facing abutment surface. The ferrule is mounted in a manually manipulatable housing which includes a front portion encapsulating the ferrule and a rear portion extending rearwardly of the front portion for manual grasping by an operator. The front portion has an open front end through which the mating end of the ferrule projects, and an open rear end through which the optical fiber extends. Latch means are provided on the front portion of the housing engageable with the forwardly facing latch surface on the ferrule for holding the ferrule encapsulated in the housing. A forwardly facing abutment surface engages the rearwardly facing abutment surface on the ferrule. The forwardly facing abutment surface on the housing is convexly rounded so that the ferrule can tilt relative to the housing.

According to one aspect of the invention, the ferrule includes an outwardly projecting peripheral flange, and the forwardly facing latch surface is defined by a front edge of the flange. The latch means is provided by a pair of latch arms engageable with the front edge at opposite sides of the ferrule. The rearwardly facing abutment surface is defined by a rear edge of the flange. In the preferred embodiment, a pair of the convexly rounded, forwardly facing abutment surfaces are provided at opposite sides of the housing engageable with the rear edge of the peripheral flange.

Other features of the invention include the convexly rounded abutment surface being provided on a flexible arm past which the ferrule is inserted into the housing through the open rear end thereof. In addition, the housing defines a front-to-rear axis extending between the front and rear portions thereof. The rearwardly facing abutment surface on the ferrule is a generally flat surface extending transversely of the axis.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
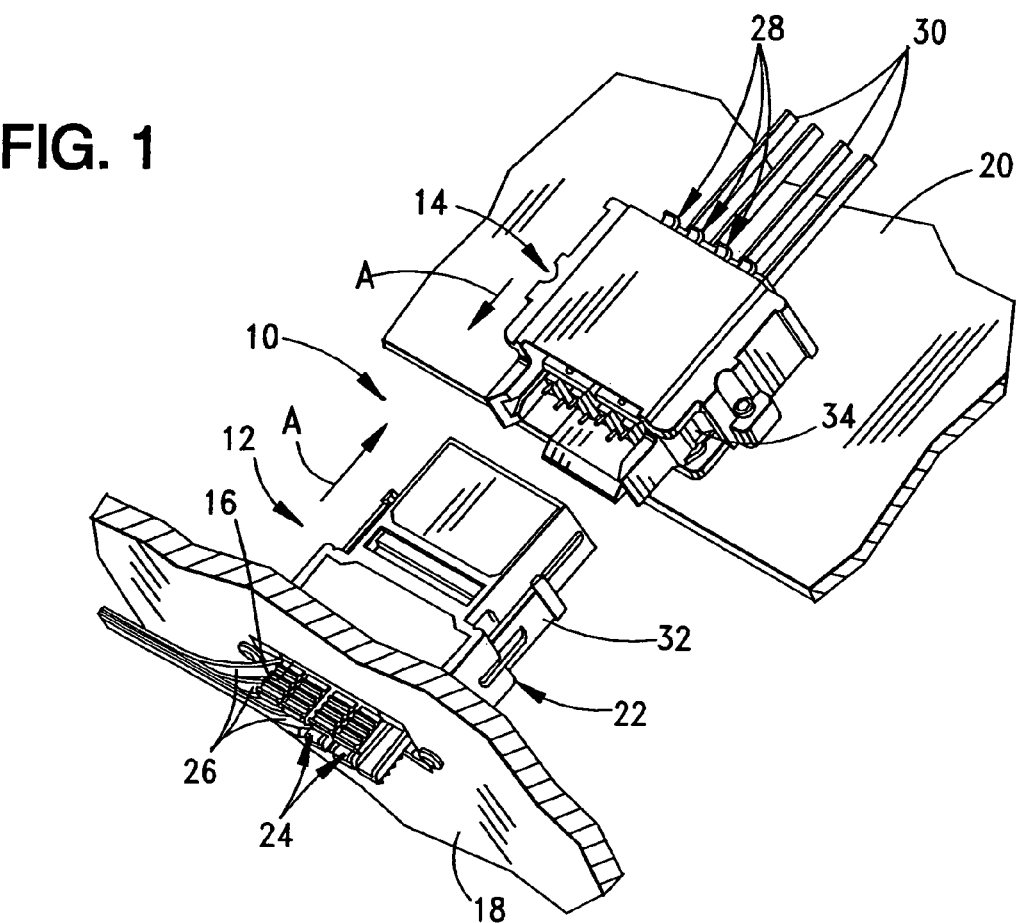
FIG. 1 is a perspective view of a mating connector assembly, with at least one of the connectors embodying the fiber optic connector modules of the invention.
Figure 2:
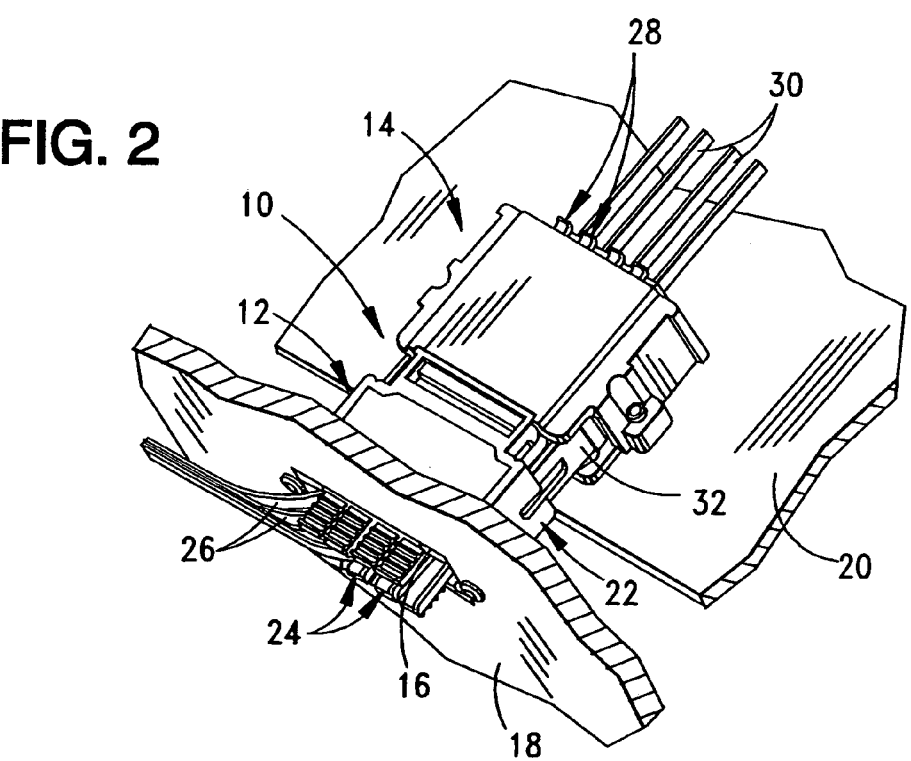
FIG. 2 is a perspective view of the mating connector assembly in FIG. 1, in mated condition.

Referring to the drawings in greater detail, and first to FIGS. 1 and 2, the invention is embodied in a mating connector assembly, generally designated 10, which includes a backplane connector assembly, generally designated 12, mateable with a daughterboard connector assembly, generally designated 14. The backplane connector assembly is mounted in an aperture 16 in a substrate, panel or backplane which, in the illustrated embodiment, is a printed circuit board. Specifically, backplane 18 can be considered the "motherboard" herein. The daughterboard connector assembly is mounted on a top surface of a second printed circuit board 20 which is considered the "daughterboard" herein.

Backplane connector assembly 12 includes an adapter, generally designated 22, which is mounted in aperture 16 in motherboard 18. Four fiber optic connector modules, generally designated 24, are inserted into adapter 22, through aperture 16, from the front of backplane 18. Each fiber optic connector is terminated to a multi-fiber cable 26. Each cable is a flat or "ribbon" cable having a plurality of optical fibers. The invention herein is incorporated in connector modules 24, as will be described in detail hereinafter.

After daughterboard connector assembly 14 is mounted on daughterboard 20, four fiber optic connector modules, generally designated 28, are inserted into the back of the connector housing. Each module 28 is terminated to a flat, multi-fiber cable 30 similar to fiber optic cables 26. Backplane connector assembly 12 and daughterboard connector assembly 14 are mateable in the direction of arrows "A" (FIG. 1) to a mated condition shown in FIG. 2, wherein the fibers of cables 26 and 30 are functionally connected. Latches 32 on opposite sides of adapter 22 engage latches 34 on opposite sides of the daughterboard connector assembly to hold the connector assemblies in mated condition as shown in FIG. 2.

Figure 3:
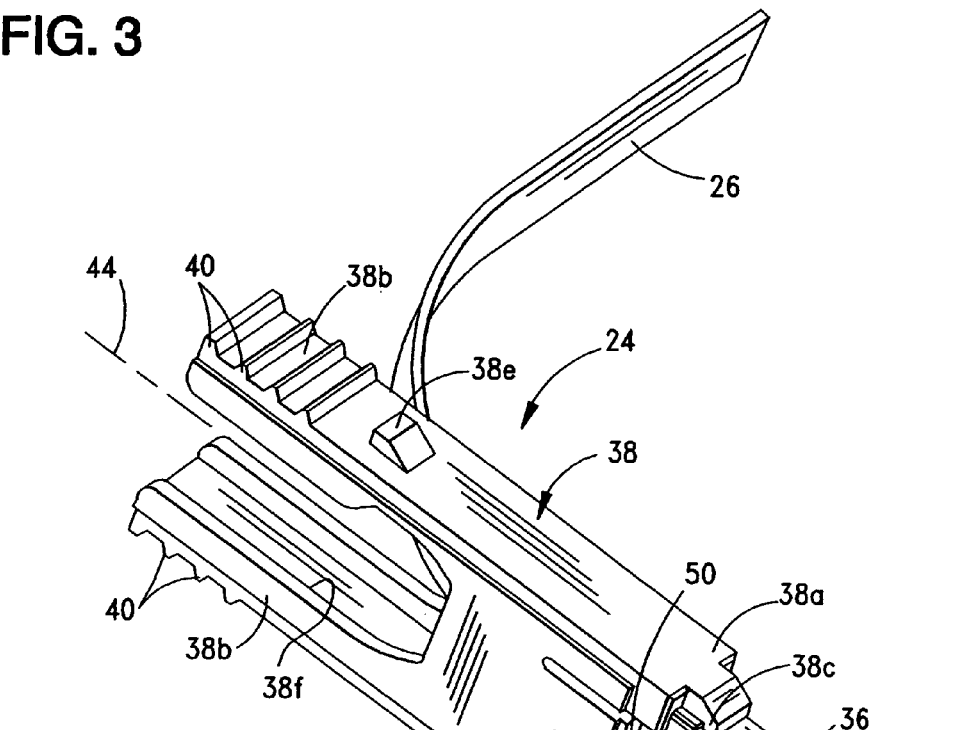
FIG. 3 is a perspective view of one of the fiber optic connector modules of the backplane connector assembly.
Figure 4:
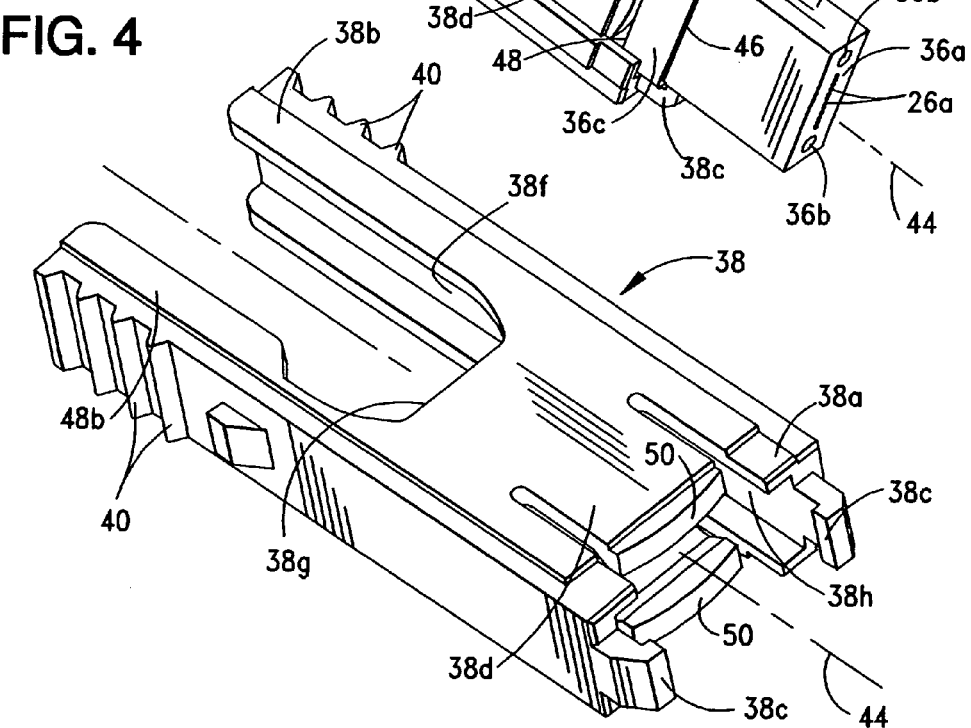
FIG. 4 is a perspective view of the housing of the connector module of FIG. 3.

FIG. 3 shows one of the fiber optic connector modules 24 which are inserted into adapter 22 as described above. Specifically, each module 24 includes a ferrule 36 terminated to one of the multi-fiber cables 26 with ends 26a of the fibers exposed at a mating face 36a of the ferrule. The ferrule includes a pair of alignment holes 36b opening at mating face 36a. The ferrule is captured by a manually manipulatable housing, generally designated 48 (FIG. 4), which includes a front portion 38a which actually captures the ferrule, and a rear portion defined by a pair of laterally spaced arms 38b that are graspable between an operator's finger. Ferrule 36 has a peripheral flange 36c. Front portion 38a of housing 38 includes a pair of forward latch hooks 38c on two opposite sides of the housing and a pair of flexible latch arms 38d on the other two opposite sides of the housing. A chamfered latch boss 38e is formed on the outside of each laterally spaced arm 38b for latching the ferrule within adapter 22 by means of latch means within the ferrule but not visible in the drawings. The manually graspable arms include serrations 40 on the outsides thereof to facilitate manual grasping thereof.

Figure 5:
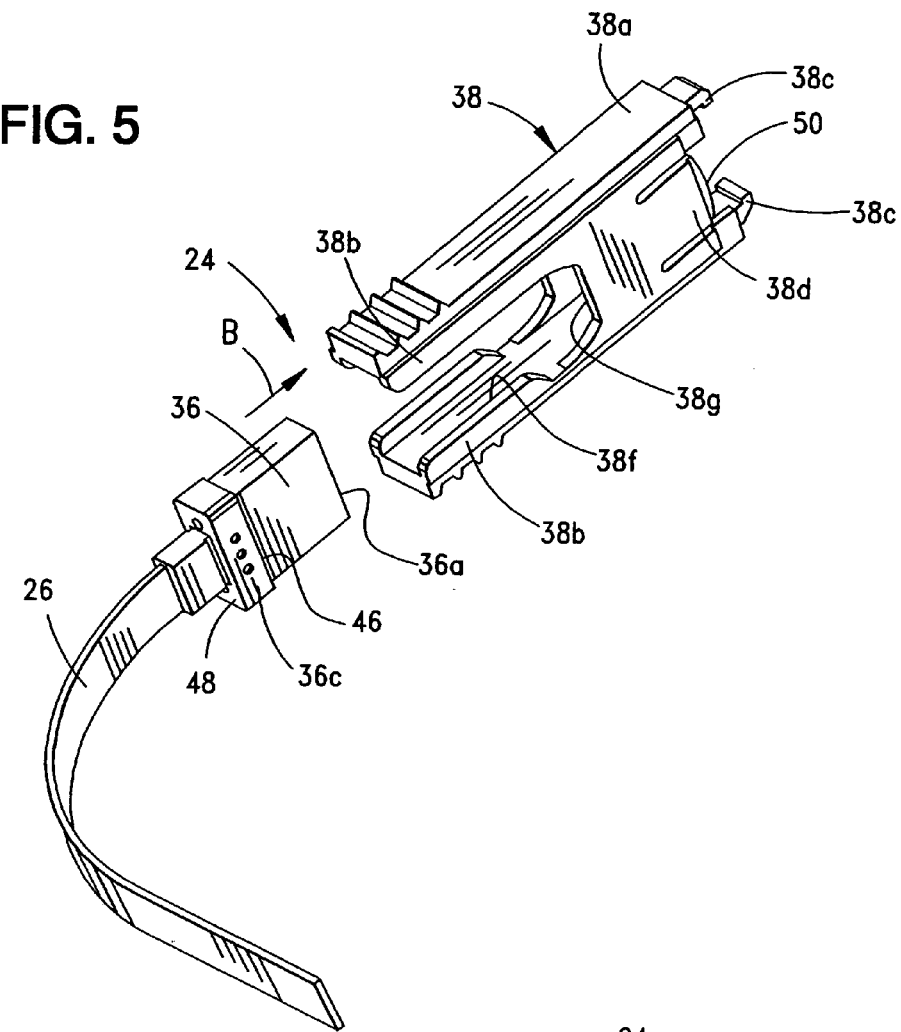
FIG. 5 is a perspective view showing the assembly procedure of the module of FIG. 3.

FIG. 5 shows that ferrule 36 is insertable into housing 38 of connector module 24 in the direction of arrow "B". The ferrule moves within channels 38f inside arms 38b and through an open rear end 38g of front portion 38a of the housing. The ferrule becomes latched in a position projecting out of an open front end 38h (FIG. 4) of the housing and is locked in the position shown in FIG. 3 by forward latch hooks 38c and flexible latch arms 38b engaging opposite sides of flange 36c of the ferrule.

Specifically, housing 38 of module 24 is hollow or open-ended as defined by open front end 38h (FIG. 4) and open rear end 38g (FIG. 5). The housing, thereby, defines a front-to-rear axis 44 through the center of the housing. When ferrule 36 is assembled in the housing, flange 36c of the ferrule defines a forwardly facing edge 46 which forms a forwardly facing latch surface for engagement by forward latch hooks 38c of the housing. The flange has a rear edge 48 which forms a rearwardly facing abutment surface engageable by the fronts ends of flexible latch arms 38d of the housing. Peripheral latch surface 46 and peripheral abutment surface 48 extend generally transversely of axis 44.

Figure 6:
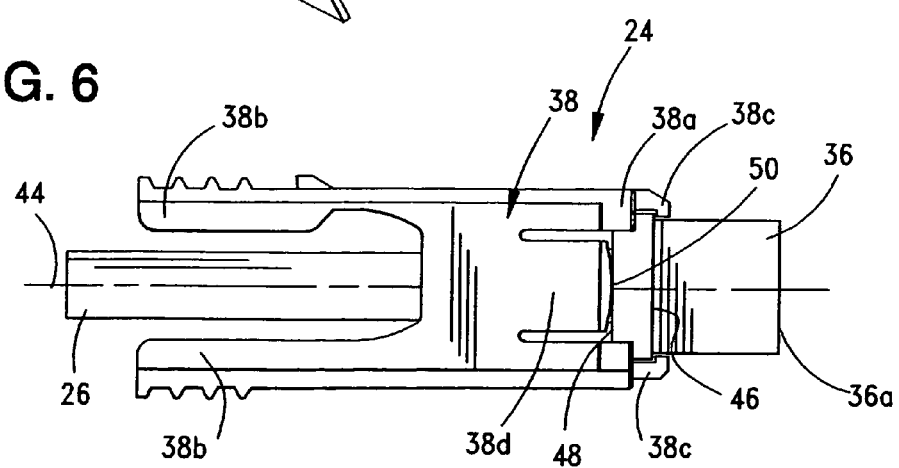
FIG. 6 is a side elevational view of the connector module in assembled condition.

The invention contemplates that housing 38, and particularly the front ends of flexible latch arms 38d, be provided with a unique forwardly facing abutment surface 50 for engaging the rearwardly facing abutment surface 48 on the ferrule. Specifically, referring to FIG. 6 in conjunction with FIGS. 3–5, it can be seen that forwardly facing abutment surface 50 is convexly rounded as it faces the straight or transverse abutment surface 48 of ferrule 36. This allows the ferrule to tilt relative to housing 38 in the event that the housing somehow is angled or skewed when presenting front mating face 36a of the ferrule to the front mating face of a ferrule of a complementary mating connector.

Figures 7, 8:
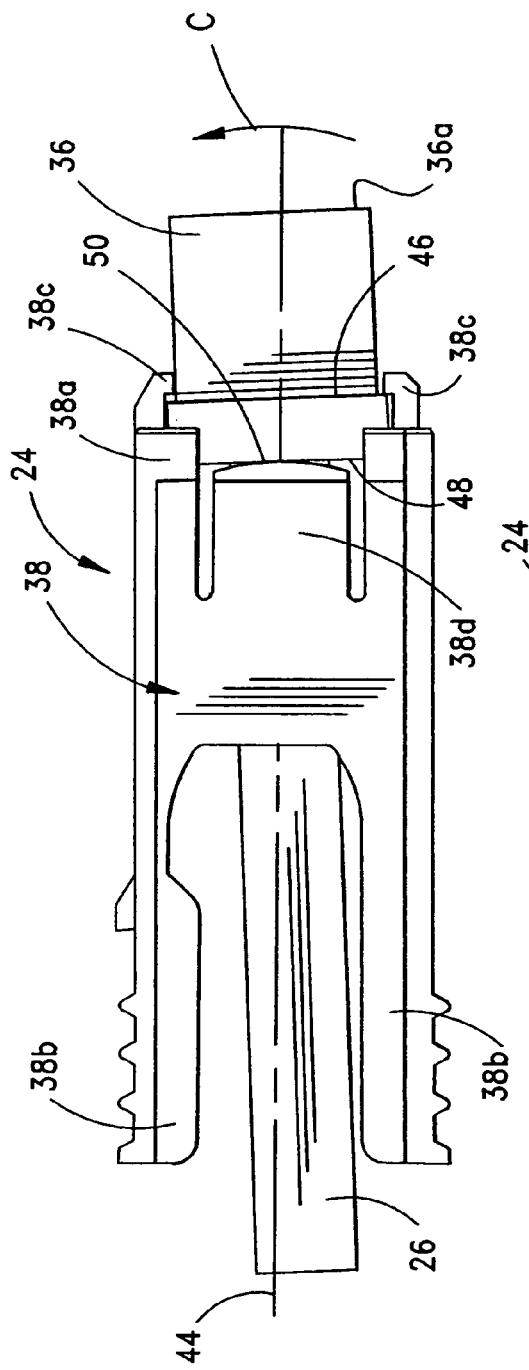
FIG. 7 is a view similar to that of FIG. 6, showing the ferrule tilted in one direction relative to the module housing.
FIG. 8 is a view similar to that of FIG. 7, with the ferrule tilted in the opposite direction.

The tilting movement of ferrule 36 relative to housing 38 is shown in FIGS. 7 and 8. In FIG. 7, it can be seen that the ferrule has tilted or rotated about convex surface 50 in the direction of arrow "C". In FIG. 8, ferrule 36 has been tiled in the opposite direction relative to housing 38 in the direction of arrow "D". These depictions of FIGS. 7 and 8 clearly show how the ferrule can tilt or rock back and forth as its abutment surface 48 rolls back and forth over convexly rounded abutment surface 50 at the front ends of flexible latch arms 38d. In other words, there is a sort of tilting floating movement of the ferrule relative to the housing to accommodate misalignments when the connector module is mated with a complementary mating connecting device.

Finally, while the invention has been shown and described herein in relation to fiber optic connector modules 24 used in adapter 22 (FIGS. 1 and 2) of backplane connector assembly 26 of mating connector assembly 10, the connector modules can be used in a wide variety of applications other than the assembly shown in FIGS. 1 and 2.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A fiber optic connector module, comprising:
a ferrule terminated to at least one optical fiber, the ferrule including a rearwardly facing abutment surface; and
a housing including a front portion from which the ferrule extends, the housing including a forwardly facing abutment surface for engaging the rearwardly facing abutment surface on the ferrule, the forwardly facing abut ment surface on the housing being convexly rounded so that the ferrule can tilt relative to the housing.

2. The fiber optic connector module of claim 1 wherein said housing defines a front-to-rear axis, and said rearwardly facing abutment surface on the ferrule is a generally flat surface extending transversely of the axis.

3. The fiber optic connector module of claim 1 wherein said ferrule includes an outwardly projecting peripheral flange, and said rearwardly facing abutment surface is defined by a rear edge of the flange.

4. The fiber optic connector module of claim 3, including a pair of said forwardly facing abutment surfaces at opposite sides of the housing engageable with the rear edge of said peripheral flange.

\* \* \* \* \*